United States Patent [19]

Hasegawa

[11] Patent Number: 5,708,644
[45] Date of Patent: Jan. 13, 1998

[54] OPTICAL HEAD FOR OPTICAL DISK DRIVE

[75] Inventor: Shinya Hasegawa, Kawasaki, Japan

[73] Assignee: Fujitsu Limited, Kawasaki, Japan

[21] Appl. No.: 724,667

[22] Filed: Oct. 1, 1996

[30] Foreign Application Priority Data

Feb. 28, 1996 [JP] Japan ................................. 8-041819

[51] Int. Cl.⁶ ................................................ G11B 7/00
[52] U.S. Cl. ................... 369/112; 369/13; 369/44.12;
369/44.14; 369/44.23; 369/103; 369/110;
369/122
[58] Field of Search .......................... 369/112, 13, 110,
369/44.12, 44.14, 44.23, 103, 109, 122

[56] References Cited

U.S. PATENT DOCUMENTS

| | | | |
|---|---|---|---|
| 5,579,291 | 11/1996 | Matsumoto | 369/112 |
| 5,583,843 | 12/1996 | Horinouchi | 369/103 |
| 5,608,233 | 3/1997 | Sahara et al. | 369/122 |
| 5,621,714 | 4/1997 | Kobayashi et al. | 369/103 |

*Primary Examiner*—David C. Nelms
*Assistant Examiner*—Kim-Kwok Chu
*Attorney, Agent, or Firm*—Armstrong, Westerman, Hattori, McLeland & Naughton

[57] ABSTRACT

An optical head for a magneto-optical disk drive, including a laser diode mounted on a stem, a magneto-optical signal detector unit, and an error signal detector unit for detecting a focusing error and a tracking error. A cap is mounted on the stem so as to surround the laser diode and these detector units, and a beam splitter unit including a polarization beam splitter and a polarizing prism is mounted on the cap. A hologram for diffracting an error signal beam toward the error signal detector unit is formed on a lower surface of the beam splitter unit.

15 Claims, 9 Drawing Sheets

OPTICAL HEAD FOR OPTICAL DISK DRIVE

BACKGROUND OF THE INVENTION

1. Field of the Invention

The present invention relates to an optical head (optical pickup) for an optical disk drive.

2. Description of the Related Art

An optical disk including a magneto-optical disk is in the limelight as a memory medium which has become the core in the rapid development of multimedia in recent years. Usually, the optical disk is accommodated in a cartridge for actual use. An optical disk cartridge is loaded into an optical disk drive to read/write data on the optical disk by an optical head.

A recording medium such as an optical disk and a magneto-optical disk is replaced by another similar recording medium in use, and these recording media have warpage or undulation due to strain in molding. As a result, such a recording medium tends to have eccentricity and inclination. Accordingly, focusing error detection and tracking error detection must be performed to read information recorded on the recording medium. A conventional optical head for a magneto-optical disk drive is configured by using many optical components including a plurality of lenses and a plurality of polarization beam splitters, so as to perform detection of information written on a magneto-optical disk and also perform focusing error detection and tracking error detection.

As other conventional optical heads, there has been proposed an optical head for an optical disk drive, using a hologram. The hologram is integrated with a laser diode and a photodetector to perform error detection of a laser beam for servo control. Such a conventional optical head using the hologram is effective for a CD driver or a CD-ROM driver. However, since such a conventional optical head for an optical disk drive does not have a polarization separating function required for magneto-optical signal detection, so that the optical head cannot be applied directly to a magneto-optical disk drive.

As mentioned above, the conventional optical head for the magneto-optical disk drive requires many optical components, causing a complex structure and an increased man-hour for assembly. Further, the conventional optical head using the hologram cannot be applied directly to a magneto-optical disk drive performing magneto-optical signal detection.

SUMMARY OF THE INVENTION

It is therefore an object of the present invention to provide an optical head for a magneto-optical disk drive which can be reduced in number of optical components, man-hour for adjustment, and size and weight.

In accordance with an aspect of the present invention, there is provided an optical head for a magneto-optical disk drive, for reading and writing information on a magneto-optical disk, comprising a stem; a laser diode fixed to the stem; an objective lens for focusing a laser beam emitted from the laser diode onto the magneto-optical disk; a magneto-optical signal detector fixed to the stem, for detecting a magneto-optical signal from a beam reflected on the magneto-optical disk; an error signal detector fixed to the stem, for detecting a focusing error and a tracking error of the laser beam focused on the magneto-optical disk, from the beam reflected on the magneto-optical disk; a cap mounted on the stem so as to surround the laser diode, the magneto-optical signal detector, and the error signal detector; a beam splitter unit mounted on the cap, for separating the beam reflected on the magneto-optical disk into a magneto-optical signal beam and an error signal beam, the beam splitter unit comprising a polarization beam splitter and beam separating means formed of a doubly refracting crystal; and a hologram formed on a lower surface of the beam splitter unit, for diffracting the error signal beam toward the error signal detector.

Preferably, the beam separating means formed of the doubly refracting crystal comprises a polarizing prism such as a Wollaston prism or a Rochon prism.

According to the present invention, the beam splitter unit configured by integrating a plurality of optical components is mounted on the cap surrounding the laser diode and the optical detectors. Accordingly, it is possible to realize a small-sized optical head for a magneto-optical disk drive which can be reduced in number of optical components and man-hour for adjustment.

In accordance with another aspect of the present invention, there is provided an optical head for an optical disk drive, for reading and writing information on an optical disk, comprising a stem; a laser diode fixed to the stem; an objective lens for focusing a laser beam emitted from the laser diode onto the optical disk; an optical signal detector fixed to the stem, for detecting an optical signal from a beam reflected on the optical disk; an error signal detector fixed to the stem, for detecting a focusing error and a tracking error of the laser beam focused on the optical disk, from the beam reflected on the optical disk; a cap mounted on the stem so as to surround the laser diode, the optical signal detector, and the error signal detector; a beam splitter unit mounted on the cap, the beam splitter unit comprising a polarization beam splitter and a prism for reflecting a beam reflected by the polarization beam splitter toward the optical signal detector; a hologram formed on a lower surface of the prism, for diffracting the beam reflected by the prism toward the error signal detector; and a quarter-wave plate located between the optical disk and the beam splitter unit.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
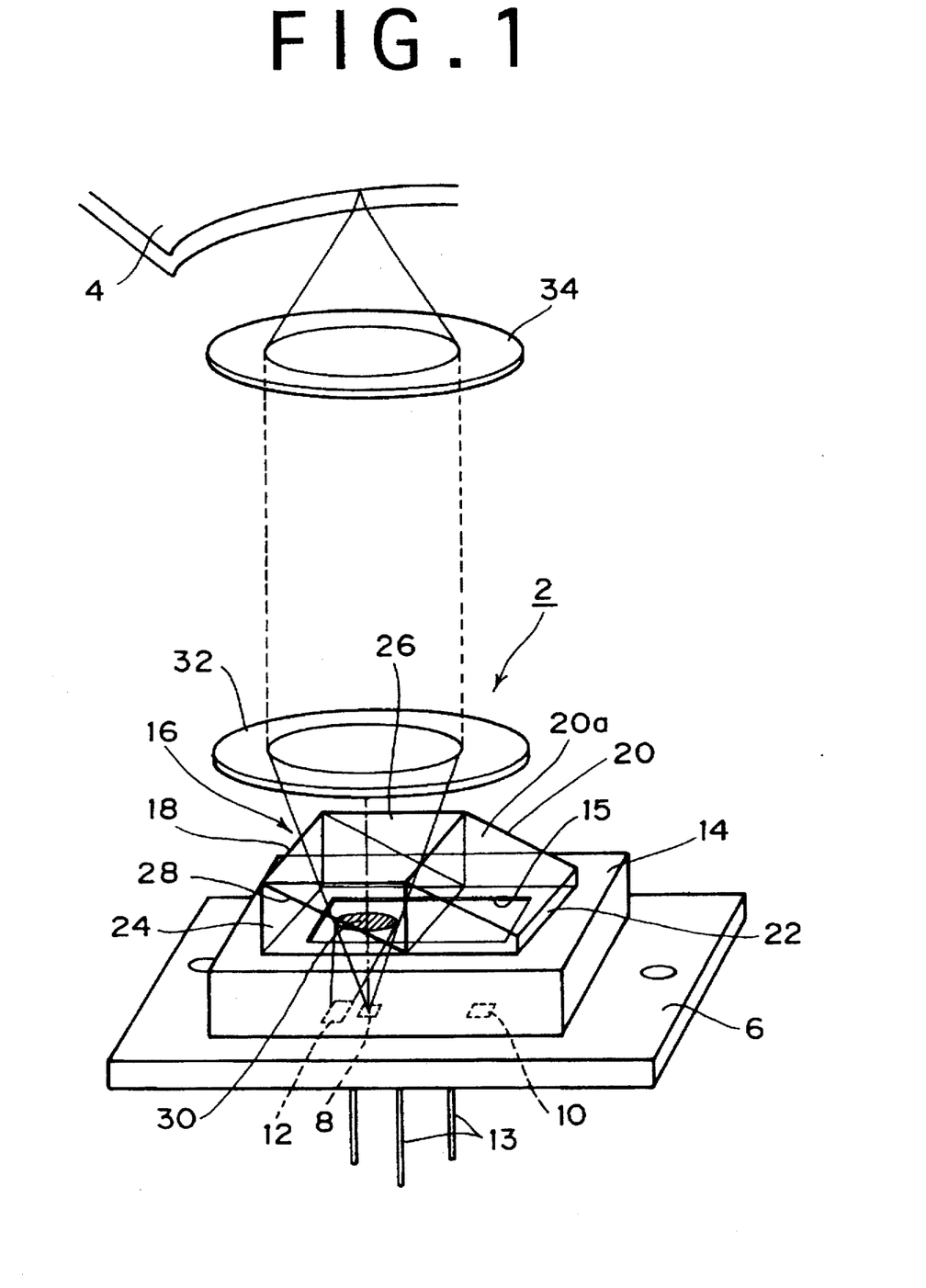
FIG. 1 is a general perspective view of a first preferred embodiment of the present invention.
Figure 2:
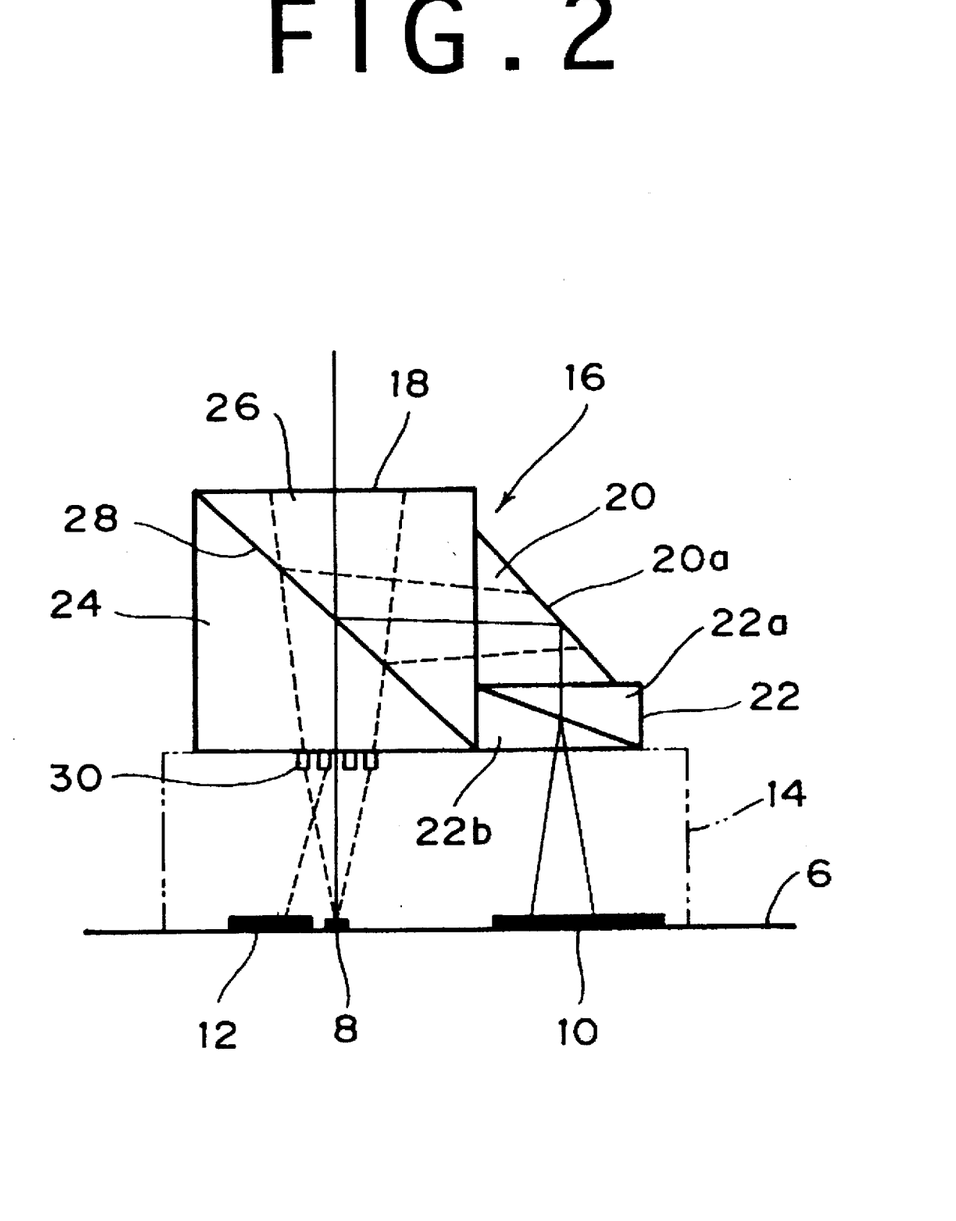
FIG. 2 is an elevational view of the first preferred embodiment.

An optical head for a magneto-optical disk drive according to a first preferred embodiment of the present invention will now be described with reference to FIGS. 1 to 3. An optical head 2 reads or writes information from or to a magneto-optical disk 4. Mounted on the upper surface of a stem 6 by die bonding or the like are a laser diode 8, a photodetector unit (photodiode) 10 for detecting a magneto-optical signal, and a photodetector unit 12 for detecting a focusing error signal and a tracking error signal. A plurality of terminals 13 project from the lower surface of the stem 6.

Also mounted on the upper surface of the stem 6 is a cap 14 for surrounding the laser diode 8, the photodetector unit 10, and the photodetector unit 12. The upper surface of the cap 14 is formed with an opening 15. A beam splitter unit 16 is fixed to the upper surface of the cap 14 by adhesive or the like. The beam splitter unit 16 includes a polarization beam splitter 18, a right-angle prism 20 bonded to a side surface of the polarization beam splitter 18, and a Wollaston prism 22 bonded to the lower surface of the prism 20 and the side surface of the polarization beam splitter 18.

The polarization beam splitter 18 is composed of a right-angle prism 24, a polarization separating film 28 formed on the oblique surface of the right-angle prism 24, and another right-angle prism 26 bonded to the oblique surface of the right-angle prism 24 with the polarization separating film 28 interposed therebetween. The polarization beam Splitter 18 has a transmittance of 70% for P-polarized light and a reflectance of 97% for S-polarized light, for example. Preferably, a reflecting film 20a is formed on the oblique surface of the right-angle prism 20. However, the reflecting film 20a may be omitted because a beam reflected by the polarization beam splitter 18 is totally reflected on the oblique surface of the right-angle prism 20.

The Wollaston prism 22 is composed of two right-angle prisms 22a and 22b bonded together by balsam. The right-angle prisms 22a and 22b are formed of doubly refracting crystals cut off so that their optic axes are perpendicular to each other. Calcite, quartz, lithium niobate (LiNbO3), etc. may be adopted as the doubly refracting crystals. The Wollaston prism 22 may be replaced by any other polarizing prism such as a Rochon prism. A hologram diffraction grating 30 to be hereinafter described in detail is formed on the lower surface of the polarization beam splitter 18. Reference numeral 32 denotes a collimator lens for converting a laser beam emitted from the laser diode 8 into a parallel beam, and reference numeral 34 denotes an objective lens for focusing the laser beam onto the magneto-optical disk 4.

In this configuration, the laser beam of P-polarized light emitted from the laser diode 8 is transmitted by the polarization beam splitter 18 with a transmittance of about 70%, and the transmitted light is next converted into a collimated beam by the collimator lens 32. The collimated beam is focused on the magneto-optical disk 4 by the objective lens 34. A beam reflected on the magneto-optical disk 4 undergoes Kerr rotation by write data to include an S-polarized light component. This reflected beam is returned to a collimated beam by the objective lens 34, and the collimated beam is next converged by the collimator lens 32 to enter the polarization beam splitter 18.

A P-polarized light component in the reflected beam is transmitted by the polarization beam splitter 18 with a transmittance of about 70%, and about 30% of the P-polarized light component is reflected by the polarization beam splitter 18. On the other hand, the S-polarized light component in the reflected beam is reflected by the polarization beam splitter 18 with a reflectance of about 97%. While the proportion of the S-polarized light component in the reflected beam is very small, the proportion of the S-polarized light component can be increased by using the polarization beam splitter 18.

The beam reflected by the polarization beam splitter 18 is totally reflected on the oblique surface of the right-angle prism 20 to enter the Wollaston prism 22. This incident beam is separated into P-polarized light and S-polarized light by the Wollaston prism 22, and both the P-polarized light and the S-polarized light are detected by the photodetector unit 10. The photodetector unit 10 includes a photodetector for detecting the P-polarized light and a photodetector for detecting the S-polarized light. Optical signals thus detected by the two photodetectors are subjected to differential detection by a method well known in the art, thereby detecting a magneto-optical signal.

On the other hand, the reflected beam from the disk 4 transmitted by the polarization beam splitter 18 enters the hologram 30. This incident beam is diffracted by the hologram 30 to enter the photodetector unit 12. The hologram 30 has four different interference fringe regions 30a, 30b, 30c, and 30d as shown in FIG. 3. Components of the beam incident on the regions 30a to 30d are diffracted in different directions.

The photodetector unit 12 includes two photodetectors 12a and 12b for detecting a focusing error and two photodetectors 12c and 12d for detecting a tracking error. The photodetector 12a is divided into two regions by a dividing line 36, and the photodetector 12b is also divided into two regions by a dividing line 38. An arrow 40 denotes a track direction of the magneto-optical disk 4.

The regions 30a and 30b of the hologram 30 are used for detection of a focusing error signal (FES), and the regions 30c and 30d of the hologram 30 are used for detection of a tracking error signal (TES). The sizes of these regions 30a to 30d are decided according to the distribution of light quantities demanded by any magneto-optical disk drives. The beams diffracted by the regions 30a and 30b respectively enter the photodetectors 12a and 12b for detecting a focusing error signal, whereas the beams diffracted by the regions 30c and 30d respectively enter the photodetectors 12c and 12d for detecting a tracking error signal.

Letting A denote a quantity of light incident on the region of the photodetector 12a on the right side of the dividing line 36, B denote a quantity of light incident on the region of the photodetector 12a on the left side of the dividing line 36, C denote a quantity of light incident on the region of the photodetector 12b on the left side of the dividing line 38, and D denote a quantity of light incident on the region of the photodetector 12b on the right side of the dividing line 38, the focusing error signal (FES) can be detected in accordance with the following equation.

$$FES=(A+C)-(B+D)$$

On the other hand, letting E denote a quantity of light incident on the photodetector 12c, and F denote a quantity of light incident on the photodetector 12d, the tracking error signal (TES) can be detected in accordance with the following equation.

$$TES=(E-F)$$

The hologram may be produced by direct drawing of an electron beam or a laser beam, for example. In the direct drawing, it is necessary to incline an interference fringe section of the hologram for the purpose of high efficiency; however, the production of the hologram is allowed by multiplex drawing. Other producing methods for the hologram include a method by directly drawing a large hologram pattern in advance, reducing the hologram pattern by a stepper to prepare a mask, and transferring this reduced pattern by photolithography. In this case, photoresist or the like is used as the mask, and an interference fringe pattern is formed by etching with an ion beam. In modification, the interference fringe pattern may be formed by holographic exposure using a hologram as an auxiliary exposure system.

Figure 4:
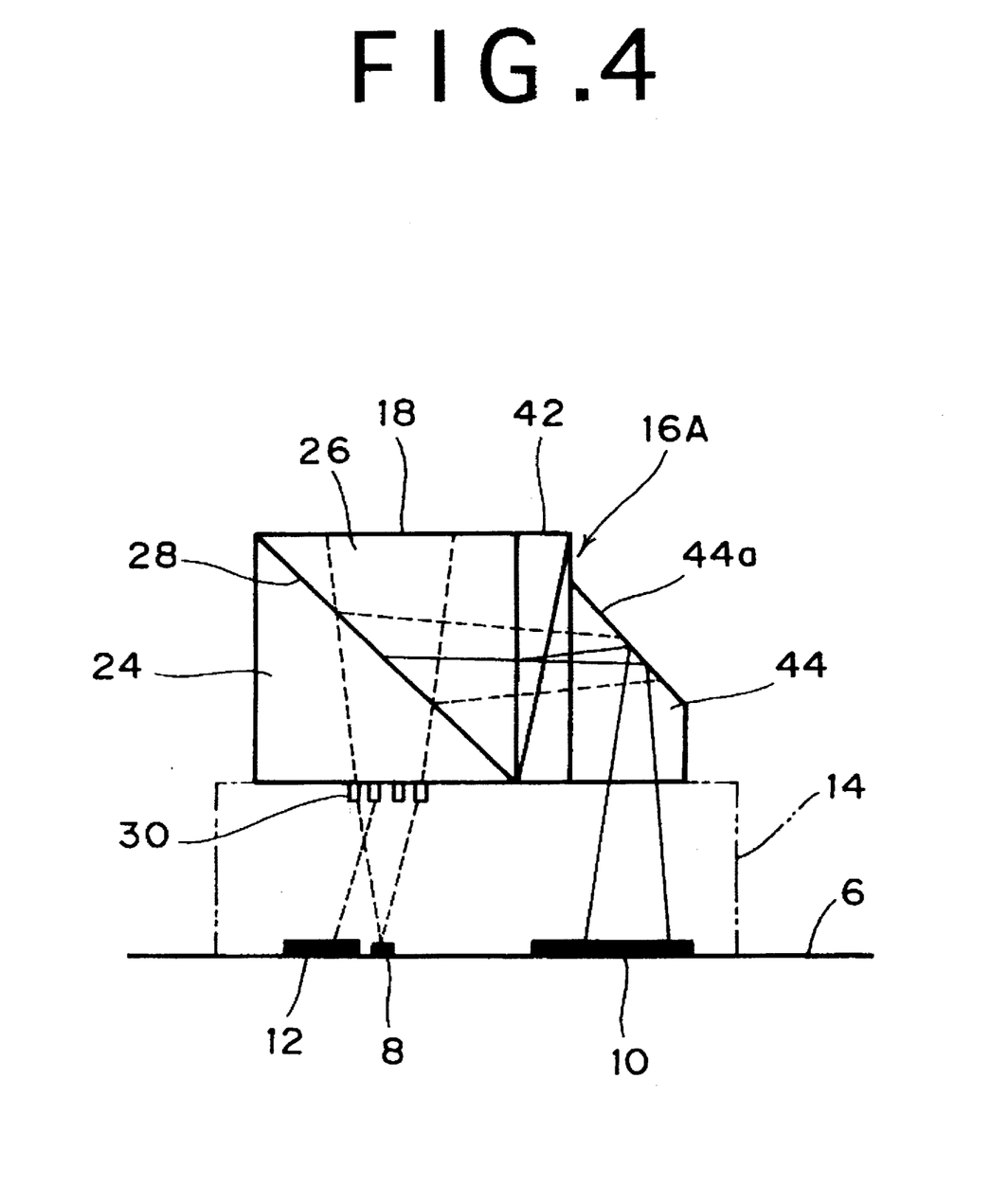
FIG. 4 is an elevational view of a second preferred embodiment of the present invention.

Referring to FIG. 4, there is shown an elevational view of a second preferred embodiment of the present invention. A beam splitter unit 16A in this preferred embodiment includes a polarization beam splitter 18, a Wollaston prism 42 bonded to a side surface of the polarization beam splitter 18, and a prism 44 bonded to the Wollaston prism 42. Preferably, a reflecting film 44a is formed on the oblique surface of the prism 44. The other configuration in this preferred embodiment is similar to that in the first preferred embodiment; so the description thereof will be omitted. Also in the second preferred embodiment wherein the Wollaston prism 42 is sandwiched between the polarization beam splitter 18 and the prism 44, a P-polarized light component and an S-polarized light component can be separated from each other to detect a magneto-optical signal like the first preferred embodiment. The Wollaston prism 42 may be replaced by any other polarizing prism such as a Rochon prism.

Figure 5:
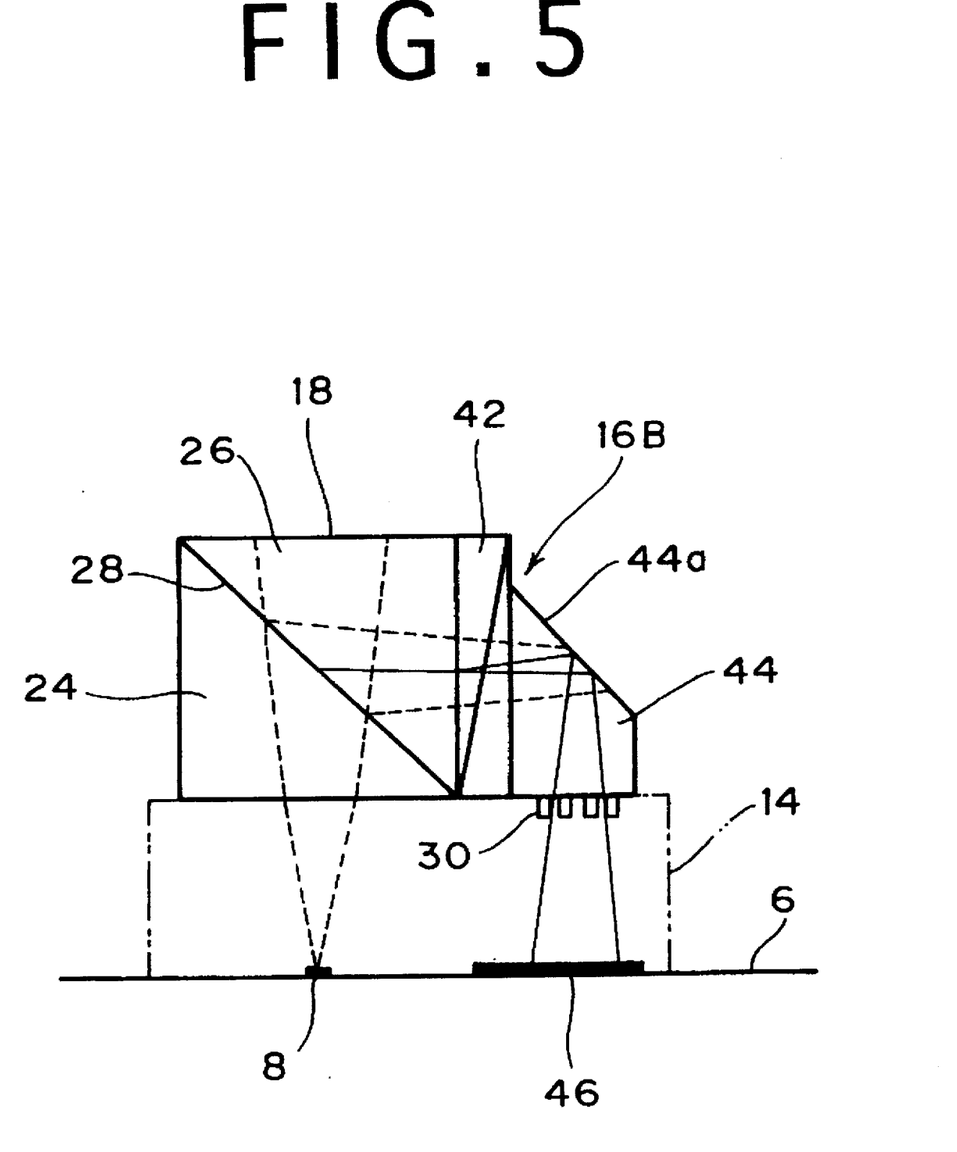
FIG. 5 is an elevational view of a third preferred embodiment of the present invention.

Referring to FIG. 5, there is shown an elevational view of a third preferred embodiment of the present invention. A beam splitter unit 16B in this preferred embodiment is similar to the beam splitter unit 16A in the second preferred embodiment; however, the unit 16B is different from the unit 16A in the point that a hologram 30 is formed on the lower surface of a prism 44 in the third preferred embodiment. Further, a photodetector unit 46 includes two photodetectors for detecting a magneto-optical signal and four photodetectors for detecting error signals. According to this preferred embodiment, two zero-order light beams passed through the hologram 30 are detected by the two photodetectors for detecting a magneto-optical signal. Beams diffracted by the hologram 30 are detected by the four photodetectors similar to the four photodetectors 12a to 12d in the first and second preferred embodiments.

Figure 6:
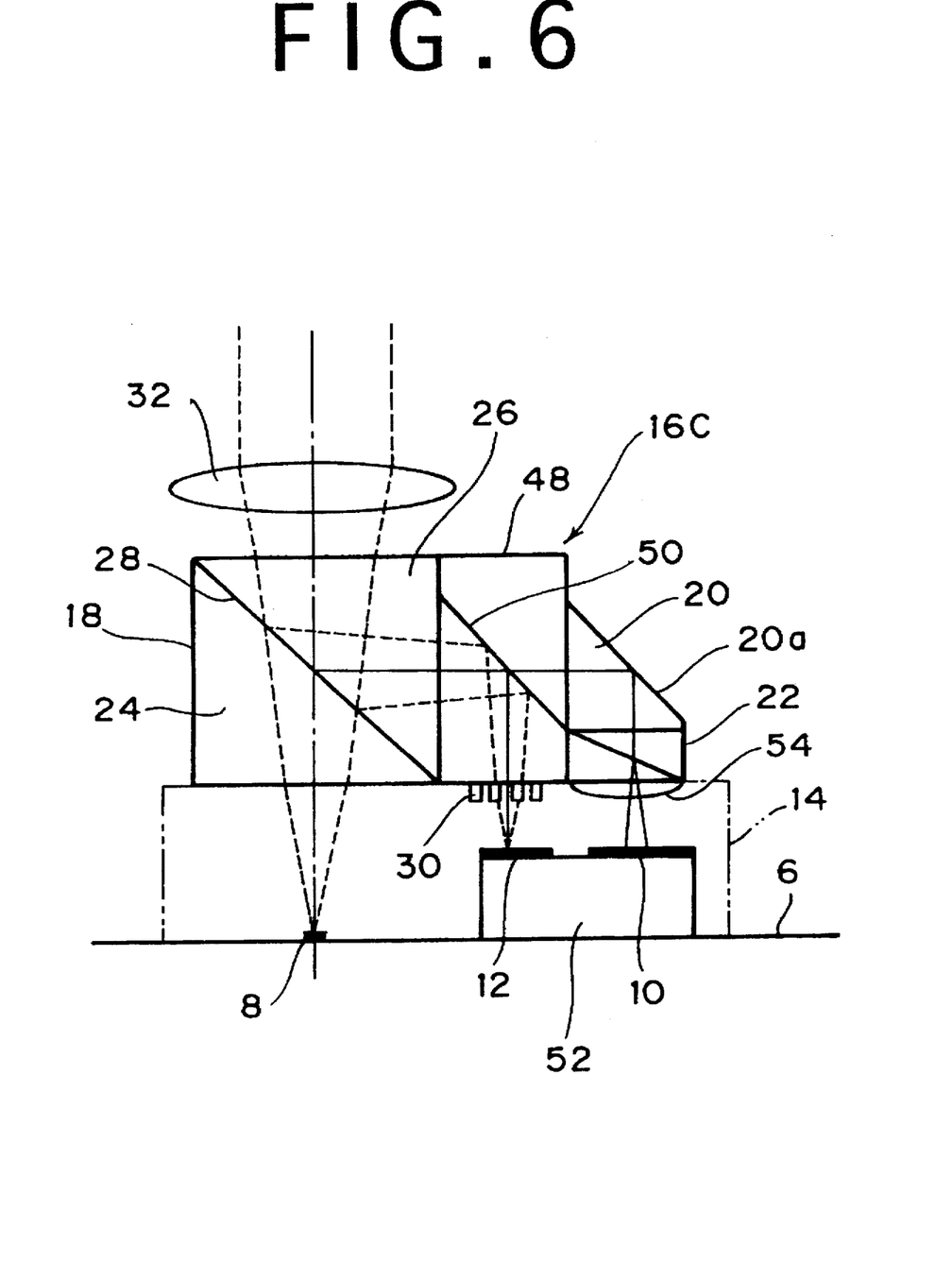
FIG. 6 is an elevational view of a fourth preferred embodiment of the present invention.

Referring to FIG. 6, there is shown an elevational view of a fourth preferred embodiment of the present invention. A beam splitter unit 16C in this preferred embodiment includes a polarization beam splitter 18, a beam splitter 48 bonded to a side surface of the polarization beam splitter 18, a right-angle prism 20 bonded to a side surface of the beam splitter 48, and a Wollaston prism 22 bonded to the lower surface of the right-angle prism 20 and the side surface of the beam splitter 48.

The beam splitter 48 has a coupler film 50. A hologram 30 similar to that in each previous preferred embodiment is formed on the lower surface of the beam splitter 48. Further, a block 52 is fixed to the upper surface of a stem 6, and photodetector units 10 and 12 are mounted on the upper surface of the block 52. The reason why the photodetector units 10 and 12 are mounted on the upper surface of the block 52 is that making an optical path length from a laser diode 8 to a polarization separating film 28 equal to an optical path length from the photodetector unit 12 for detecting error signals to the polarization separating film 28 is preferable from a viewpoint of chromatic aberration of a beam.

A beam reflected on a magneto-optical disk 4 (see FIG. 1) is converged by a collimator lens 32 to enter the polarization beam splitter 18. About 70% of a P-polarized light component of the reflected beam is transmitted by the polarization beam splitter 18, and about 30% of the P-polarized light component is reflected by the polarization beam splitter 18. On the other hand, about 97% of an S-polarized light component of the reflected beam is reflected by the polarization beam splitter 18. The beam reflected by the polarization beam splitter 18 is split into a transmitted beam and a reflected beam by the beam splitter 48. The transmitted beam is totally reflected on the oblique surface of the right-angle prism 20, and is next separated into a P-polarized light beam and an S-polarized light beam by the Wollaston prism 22. Then, the two beams are converged by a lens 54 to respectively enter the two photodetectors of the photodetector unit 10.

Figure 3:
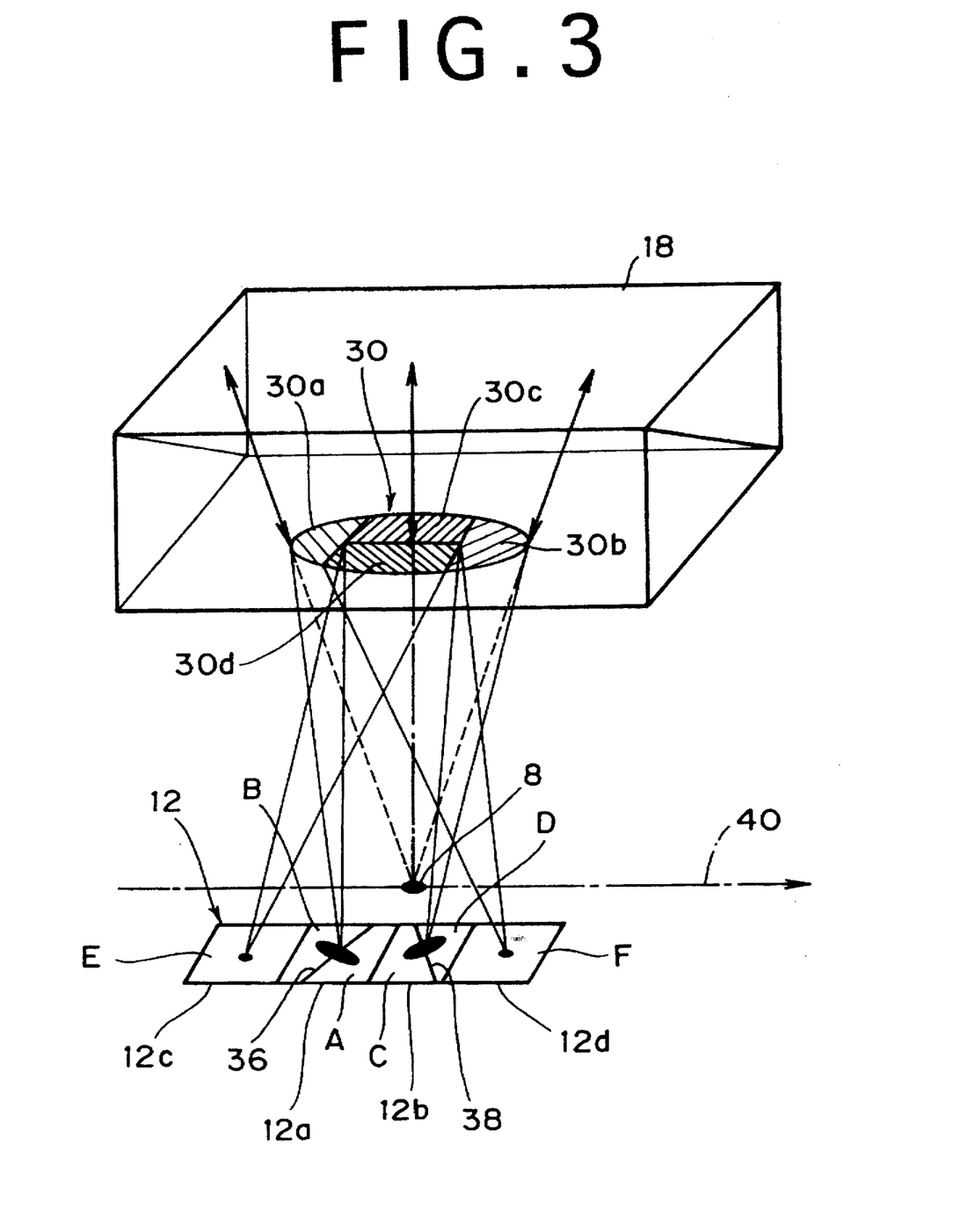
FIG. 3 is a view showing an error signal detecting system in the first preferred embodiment.

On the other hand, the beam reflected by the beam splitter 48 enters the hologram 30 similar to that shown in FIG. 3, and is diffracted by the hologram 30. Then, the diffracted beams respectively enter the four photodetectors of the photodetector unit 12. Also in this preferred embodiment, the Wollaston prism 22 may be replaced by any other polarizing prism such as a Rochon prism. Further, the lens 54 bonded to the lower surface of the Wollaston prism 22 may be omitted.

Figure 7:
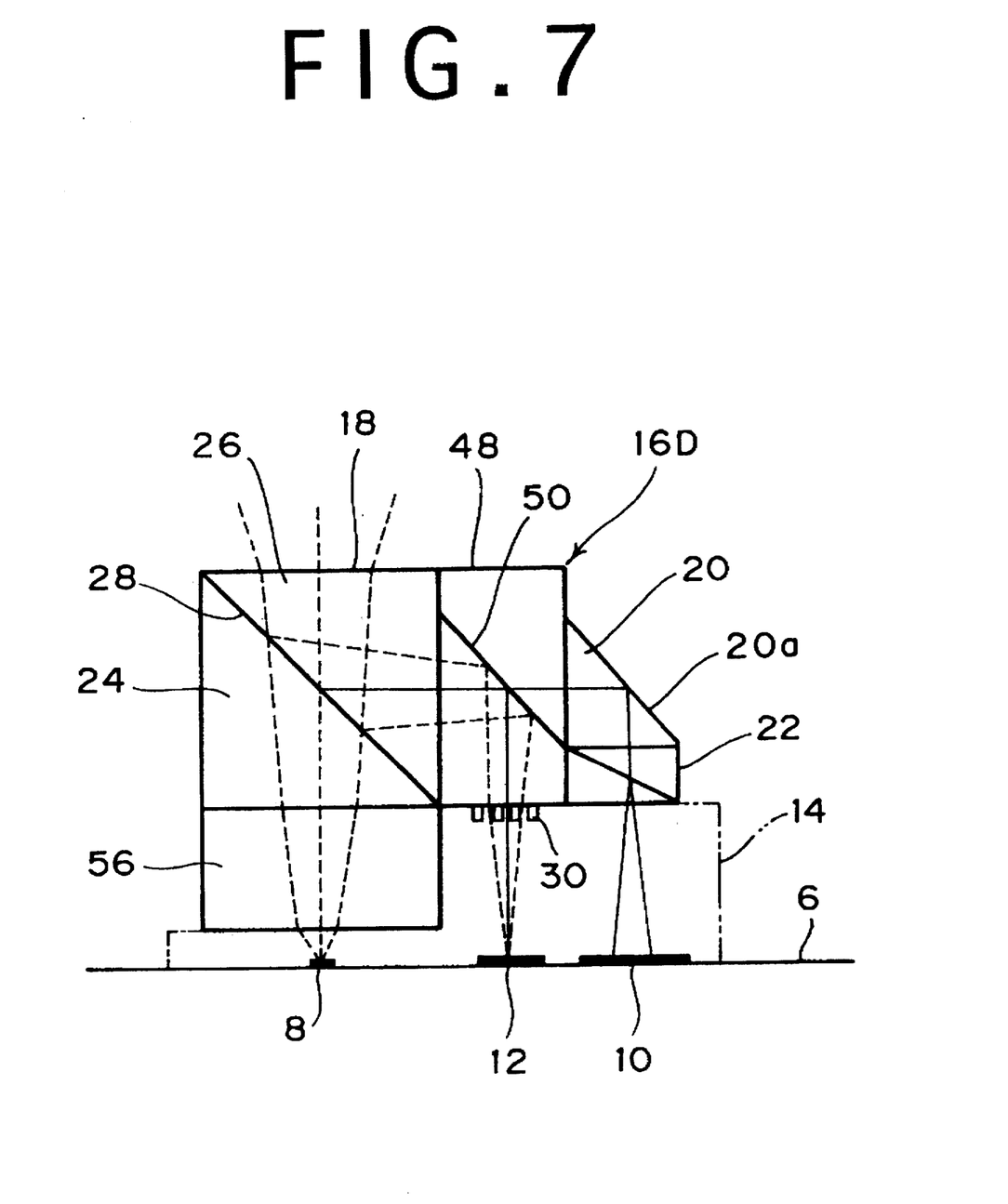
FIG. 7 is an elevational view of a fifth preferred embodiment of the present invention.

Referring to FIG. 7, there is shown an elevational view of a fifth preferred embodiment of the present invention. In the fourth preferred embodiment mentioned above, the photodetector units 10 and 12 are mounted on the upper surface of the block 52 in order to make the optical path length from the polarization separating film 28 to the laser diode 8 equal to the optical path length from the polarization separating film 28 to the photodetector unit 12. In contrast, a beam splitter unit 16D in the fifth preferred embodiment includes a doubly refracting crystal 56 such as lithium niobate, bonded to the lower surface of a polarization beam splitter 18, rather than providing the block 52. The doubly refracting crystal 56 has a refractive index of about 1.8, which is larger than the refractive index (about 1.5) of prisms 24 and 26 of the polarization beam splitter 18, so that an effective optical path length from the laser diode 8 to the polarization separating film 28 can be increased.

By suitably setting the thickness of the doubly refracting crystal 56, the effective optical path length from the polarization separating film 28 to the laser diode 8 can be made equal to the effective optical path length from the polarization separating film 28 to the photodetector unit 12 even in the case that the laser diode 8 and the photodetector units 10 and 12 are mounted directly on the upper surface of the stem 6 as shown in FIG. 7.

Figure 8:
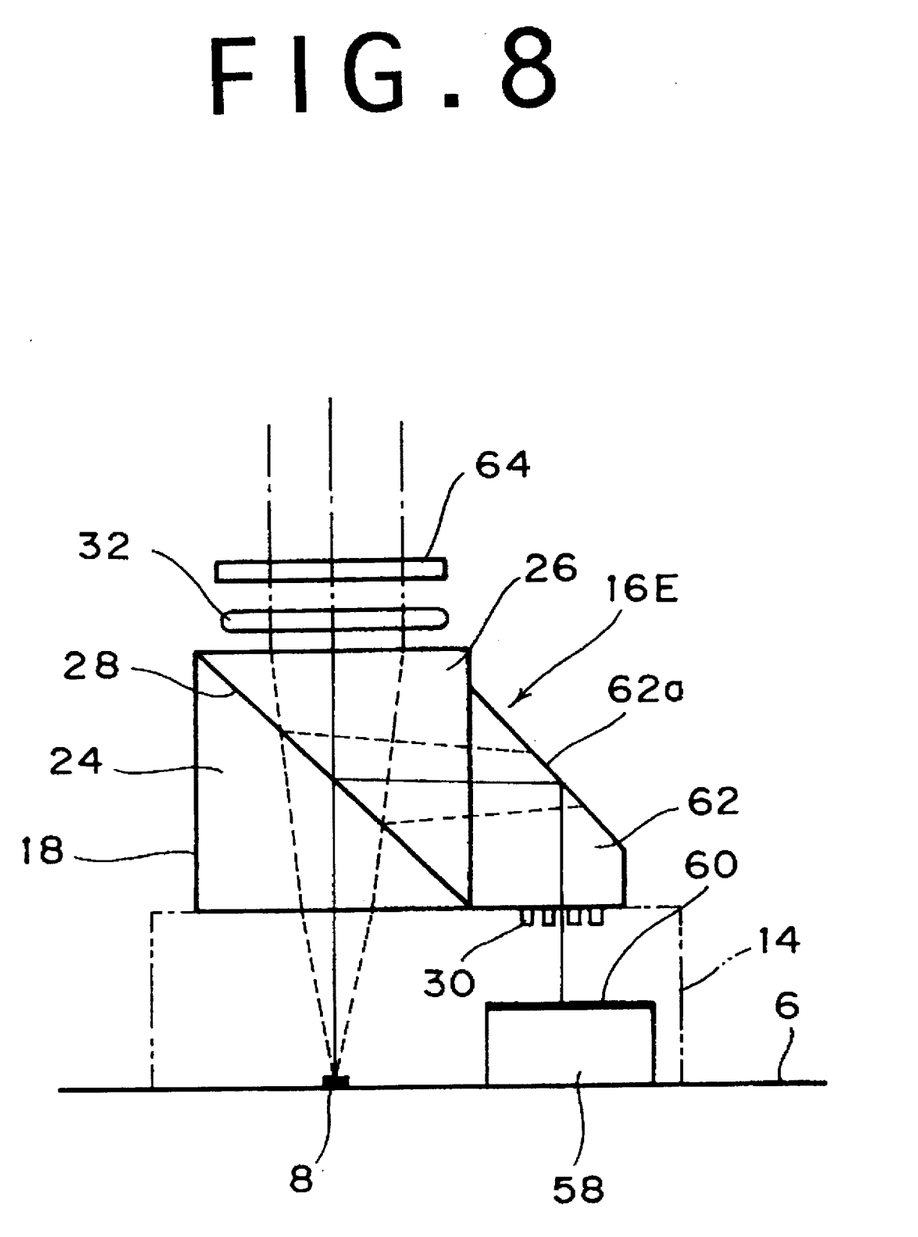
FIG. 8 is an elevational view of a sixth preferred embodiment of the present invention.

Referring to FIG. 8, there is shown an elevational view of a sixth preferred embodiment of the present invention. An optical head in this preferred embodiment is one suitable for a phase-change type optical disk drive. A beam splitter unit 16E in this preferred embodiment includes a polarization beam splitter 18 and a prism 62 bonded to a side surface of the polarization beam splitter 18. Preferably, a reflecting film 62a is formed on the oblique surface of the prism 62. Further, a hologram 30 similar to that shown in FIG. 3 is formed on the lower surface of the prism 62.

A block 58 is fixed to the upper surface of a stem 6, and a photodetector unit 60 is mounted on the upper surface of the block 58. The photodetector unit 60 includes a photodetector for detecting an optical signal, two photodetectors for detecting a focusing error signal, and two photodetectors for detecting a tracking error signal. Further, a quarter-wave plate 64 is inserted between a collimator lens 32 and an objective lens 34 (see FIG. 1).

A p-polarized light component of a laser beam emitted from a laser diode 8 is transmitted by the polarization beam splitter 18, and a transmitted beam from the polarization beam splitter 18 is converted into a collimated beam by the collimator lens 32 to enter the quarter-wave plate 64, in which linearly polarized light is converted into circularly polarized light. Then, the laser beam of the circularly polarized light obtained by the quarter-wave plate 64 is focused onto an optical disk by the objective lens 34. When information is present on the optical disk, the laser beam focused on the optical disk is strongly reflected, whereas when information is absent on the optical disk, the laser beam focused on the optical disk is weakly reflected. The reflected beam from the optical disk is passed through the quarter-wave plate 64, in which the P-polarized light is converted into S-polarized light having a vibration plane perpendicular to that of the P-polarized light.

Accordingly, this S-polarized light beam is reflected by the polarization separating film 28 of the polarization beam splitter 18 to enter the prism 62. The beam is next totally reflected on the oblique surface of the prism 62 to enter the hologram 30. A zero-order light beam passed through the hologram 30 is detected by the photodetector for detecting an optical signal. The intensity of a beam to be reflected on the optical disk changes according to whether or not information is present on the optical disk. Accordingly, by monitoring an output from the photodetector for detecting an optical signal, information recorded on the optical disk can be read. The detection of a focusing error and a tracking error is similar to that in the optical head for the magneto-optical disk drive according to the first to fifth preferred embodiments mentioned above.

Figure 9:
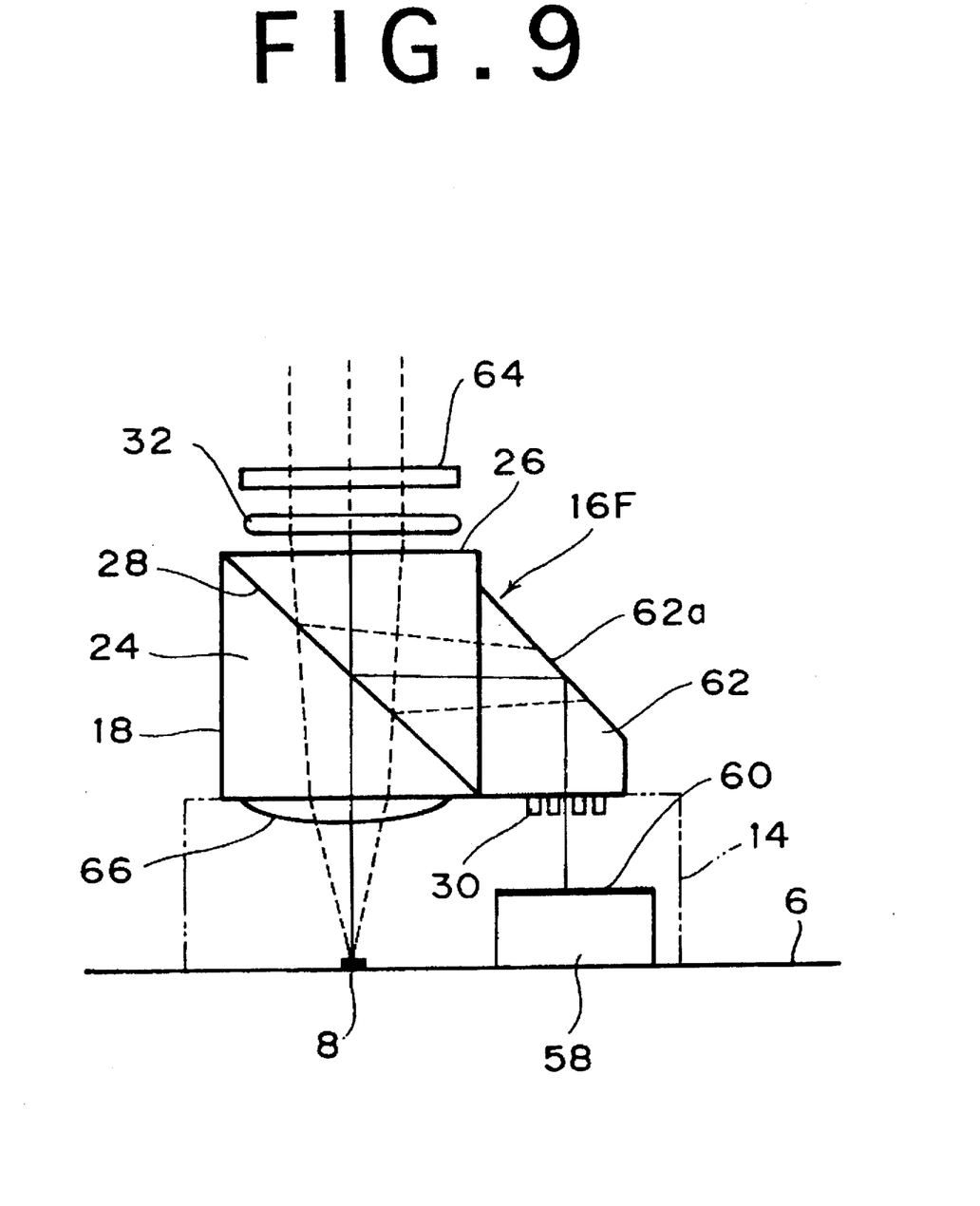
FIG. 9 is an elevational view of a seventh preferred embodiment of the present invention.

Referring to FIG. 9, there is shown an elevational view of a seventh preferred embodiment of the present invention. A beam splitter unit 16F in this preferred embodiment is similar to the beam splitter unit 16E in the sixth preferred embodiment with the exception that a lens 66 is bonded to a polarization beam splitter 18 of the beam splitter unit 16F. The lens 66 allows substantially normal incidence of a laser beam emitted from a laser diode 8 to the polarization beam splitter 18, so that incident angle dependence by the position of a polarization separating film 28 can be reduced to allow polarization separation with improvement in S/N.

According to the present invention as described above, the beam splitter unit including the integrated polarization beam splitter and polarizing prism is adopted, and the hologram is integrally formed on the lower surface of the beam splitter unit. Accordingly, it is possible to provide an optical head for a magneto-optical disk drive which can be reduced in size and cost and can be improved in reliability. Further, the beam splitter unit including the integrated polarization beam splitter and prism is adopted, and the hologram is integrally formed on the lower surface of the beam splitter unit. Accordingly, it is possible to provide an optical head for an optical disk drive which can be reduced in size and cost and can be improved in reliability.

What is claimed is:

1. An optical head for a magneto-optical disk drive, for reading and writing information on a magneto-optical disk, comprising:

a stem;

a laser diode fixed to said stem;

a magneto-optical signal detector fixed to said stem, for detecting a magneto-optical signal from a beam reflected on said magneto-optical disk;

an error signal detector fixed to said stem, for detecting a focusing error and a tracking error of said laser beam focused on said magneto-optical disk, from said beam reflected on said magneto-optical disk;

a cap mounted on said stem so as to surround said laser diode, said magneto-optical signal detector, and said error signal detector;

a beam splitter unit mounted on said cap, for separating said beam reflected on said magneto-optical disk into a magneto-optical signal beam and an error signal beam, said beam splitter unit including a polarization beam splitter and beam separating means formed of a doubly refracting crystal; and a hologram formed on a lower surface of said beam splitter unit, for diffracting said error signal beam toward said error signal detector.

2. An optical head for a magneto-optical disk drive according to claim 1, wherein:

said beam splitter unit further includes a prism for reflecting a beam reflected by said polarization beam splitter toward said beam separating means; and said hologram is formed on a lower surface of said polarization beam splitter.

3. An optical head for a magneto-optical disk drive according to claim 1, wherein:

said beam splitter unit further includes a prism for reflecting a beam reflected by said polarization beam splitter toward said magneto-optical signal detector; and said polarization beam splitter, said beam separating means, and said prism are integrated together so as to be juxtaposed in a direction perpendicular to an optical axis of said laser beam emitted from said laser diode.

4. An optical head for a magneto-optical disk drive according to claim 1, wherein:

said beam splitter unit further includes a beam splitter for separating a beam reflected by said polarization beam splitter into a transmitted beam and a reflected beam, and a prism for reflecting said transmitted beam from said beam splitter toward said beam separating means;

said polarization beam splitter, said beam splitter, and said prism are integrated together so as to be juxtaposed in a direction perpendicular to an optical axis of said laser beam emitted from said laser diode.

5. An optical head for a magneto-optical disk drive according to claim 4, wherein said beam separating means is fixed to a lower surface of said prism.

6. An optical head for a magneto-optical disk drive according to claim 5, further comprising a lens fixed to a lower surface of said beam separating means, for converging said magneto-optical signal beam toward said magneto-optical signal detector.

7. An optical head for a magneto-optical disk drive according to claim 5, wherein said hologram is formed on a lower surface of said beam splitter.

8. An optical head for a magneto-optical disk drive according to claim 4, further comprising a doubly refracting crystal member fixed to a lower surface of said polarization beam splitter.

9. An optical head for a magneto-optical disk drive, for reading and writing information on a magneto-optical disk, comprising:

a stem;

a laser diode fixed to said stem;

a magneto-optical signal detector fixed to said stem, for detecting a magneto-optical signal from a beam reflected on said magneto-optical disk;

an error signal detector fixed to said stem, for detecting a focusing error and a tracking error of said laser beam focused on said magneto-optical disk, from said beam reflected on said magneto-optical disk;

a cap mounted on said stem so as to surround said laser diode, said magneto-optical signal detector, and said error signal detector;

a beam splitter unit mounted on said cap, said beam splitter unit including a polarization beam splitter, beam separating means formed of a doubly refracting crystal, and a prism; and a hologram formed on a lower surface of said prism, for diffracting an error signal beam toward said error signal detector.

10. An optical head for a magneto-optical disk drive according to claim 9, wherein said polarization beam splitter, said beam separating means, and said prism are integrated together so as to be juxtaposed in a direction perpendicular to an optical axis of said laser beam emitted from said laser diode.

11. An optical head for an optical disk drive, for reading and writing information on an optical disk, comprising:

a stem;

a laser diode fixed to said stem;

an optical signal detector fixed to said stem, for detecting an optical signal from a beam reflected on said optical disk;

an error signal detector fixed to said stem, for detecting a focusing error and a tracking error of said laser beam focused on said optical disk, from said beam reflected on said optical disk;

a cap mounted on said stem so as to surround said laser diode, said optical signal detector, and said error signal detector;

a beam splitter unit mounted on said cap, said beam splitter unit including a polarization beam splitter and a prism for reflecting a beam reflected by said polarization beam splitter toward said optical signal detector;

a hologram formed on a lower surface of said prism, for diffracting said beam reflected by said prism toward said error signal detector; and a quarter-wave plate located between said optical disk and said beam splitter unit.

12. An optical head for an optical disk drive according to claim 11, further comprising a lens fixed to a lower surface of said polarization beam splitter.

13. An optical head for an optical disk drive, for directing a laser beam onto an optical disk surface and detecting a reflected beam from said optical disk surface to read information recorded on said optical disk surface, comprising:

a stem;

a laser diode fixed to said stem;

an optical signal detector fixed to said stem, for receiving said reflected beam from said optical disk surface to detect an optical signal;

an error signal detector fixed to said stem, for receiving said reflected beam from said optical disk surface to detect a focusing error and a tracking error of said laser beam focused on said optical disk surface;

a beam splitter unit mounted above said stem, for separating said reflected beam from said optical disk surface into an optical signal beam incident on said optical signal detector and an error signal beam incident on said error signal detector, said beam splitter unit including a polarization beam splitter and a prism; and a hologram provided on said beam splitter unit, for separating said error signal beam into a focusing error signal beam and a tracking error signal beam to diffract said focusing error signal beam and said tracking error signal beam toward said error signal detector.

14. An optical head for an optical disk drive according to claim 13, wherein said beam splitter unit further includes beam separating means formed of a doubly refracting crystal, for separating an incident beam into an S-polarized light beam and a P-polarized light beam.

15. An optical head for an optical disk drive according to claim 13, wherein said polarization beam splitter has a polarization separating film, and an optical path length from an emission surface of said laser diode to said polarization separating film of said polarization beam splitter is equal to an optical path length from said polarization separating film to a photodetecting surface of said error signal detector.

* * * * *